UNITED STATES PATENT OFFICE.

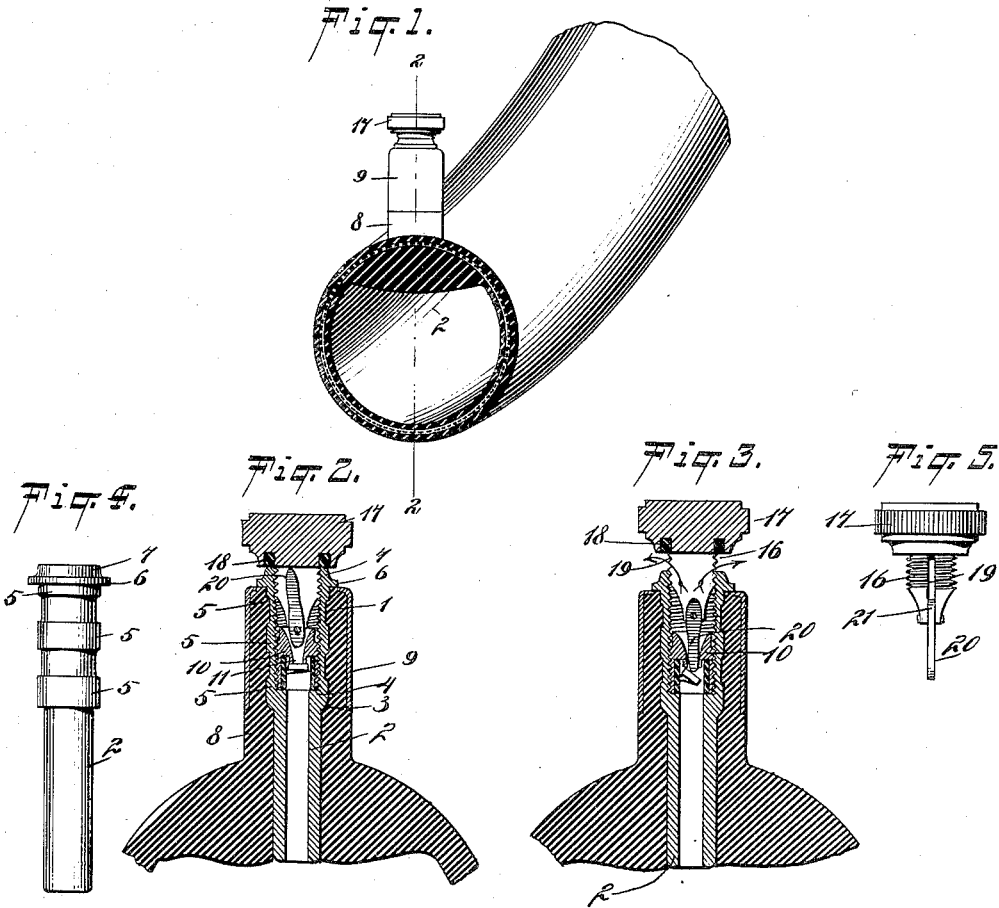# W. G. URMSON.
VALVE.
No. 604,809. Patented May 31, 1898.
WITNESSES:
William P. Goebel.
C. R. Ferguson
INVENTOR
W. G. Urmson
BY
ATTORNEYS.

WILLIAM G. URMSON, OF NEW BRUNSWICK, NEW JERSEY.

VALVE.

SPECIFICATION forming part of Letters Patent No. 604,809, dated May 31, 1898.

Application filed June 1, 1897. Serial No. 638,972. (No model.)

*To all whom it may concern:*

Be it known that I, WILLIAM G. URMSON, of New Brunswick, in the county of Middlesex and State of New Jersey, have invented a new and useful Improvement in Valves, of which the following is a full, clear, and exact description.

This invention relates particularly to valves for pneumatic tires and to binding devices for the valves; and the object is to provide a simple, neat, and comparatively inexpensive valve having a maximum of strength with a minimum of weight, and, further, to so construct the parts that they afford ready access and are not liable to get out of order or be easily broken; also, a simple and neat binding device for the valves to make easy their assemblage with the tires and also protect and serve as a cover for the tire-nipples.
I will describe a valve and binding device embodying my invention and then point out the novel features in the appended claims.

Reference is to be had to the accompanying drawings, forming a part of this specification, in which similar characters of reference indicate corresponding parts in all the views.

Figure 1 shows a portion of a pneumatic tire having a valve and binding device embodying my invention applied thereto. Fig. 2 is a longitudinal section of the valve and binding device as applied to a tire and showing the parts in one position. Fig. 3 is a similar section showing the parts in another position. Fig. 4 is a side elevation of the valve-casing. Fig. 5 is a side elevation of a plug-cap employed. Fig. 6 is an inverted plan view of the valve. Fig. 7 is a section on the line 7 7 of Fig. 6. Fig. 8 is a top plan view of the valve-carrier, and Fig. 9 is a section on the line 9 9 of Fig. 8.

The valve-casing comprises an interiorly-threaded portion 1 and a tubular portion 2 of reduced diameter. At the junction of the portion 1 and the portion 2 an exterior annular shoulder 3 is formed, and at the base of the interior-threaded portion an interior annular shoulder or seat 4 is formed. The exterior of the portion 1 is provided with annular ribs 5, and the outer end of said portion 1 is provided with an outwardly-extended annular flange 6 and an extended seat 7. This valve-casing is designed to be inserted through the rubber nipple 8, extended from the tire, and also through and ending even with the inner side of the tire. The outwardly-extended annular flange 6 is thus brought in contact with the outer end of the nipple 8 and will prevent a further inward movement of the valve-casing, thus obviating any danger of the inner end of the valve-casing from contacting with the opposite side of the inflatable tire. Said end of the valve-casing is deprived of sharp edges to avoid wear or injury to the tire.

Before placing the valve-casing in position, as shown in the drawings, a thimble 9 is placed over the outer side of the nipple 8, surrounding, supporting, and strengthening the same, and by forcing said valve-casing into the nipple the annular ribs 5 on the exterior of the valve-casing will be forced into the flexible material comprising the nipple, thus securing the valve-casing from movement within the nipple. At its outer end the thimble will of course have an opening sufficiently large to pass over the valve-casing. This thimble 9 will not only form a binder, but will protect the nipple from damage and also present a neat appearance as a cover for the nipple.

10 indicates a tubular valve-carrier having an exterior screw-thread engaging with the interior screw-thread of the portion 1 of the valve-casing. At its upper portion this valve-carrier has a flaring port, and from the lower portion of this port a valve-seat 11 extends downward. For convenience in inserting the valve-carrier I provide it at opposite sides with slots 12, in which a screw-driver or similar instrument may be engaged to turn said carrier into the casing.

The valve is made in the form of a flap-valve, and it comprises a flexible tube 13, in which the valve 14 is movable. This flap-valve 14 is attached at one side, as at 15, to the interior of the tubular portion 13. In manufacturing this valve it will be made to stand at an upward angle transversely of the tube 13, the lower portion 15 being at the side of the hinge connection, so that when the tube and valve are inserted in the carrier there will be an equal pressure of the valve upon the end of the seat 11, as indicated in Fig. 9.

The plug-cap comprises an exteriorlythreaded portion 16 and a finger portion 17. The under side of the finger portion is provided with an annular channel, in which a packing-ring 18, of flexible material, is placed and adapted to engage upon the projection 7 of the valve-casing, thus preventing any possible escape of air when said plug-cap is in its closed position. The threaded portion 16 is longitudinally slotted, as at 19, and pivoted in this slot 19 is a push-tongue 20, used to open the valve for deflating tires. This push-tongue 20 will have its pivotal connection with the threaded portion 16 of the plug-cap near its end. This tongue will be of a length to swing into the opening 19 of the threaded portion 16, as indicated in Fig. 2, and when the plug-cap is removed and the tongue is in such position the shorter end 21 of the tongue will provide a ready means for opening or extending the same when necessary. Of course as this tongue is of thin material it will not obstruct the passage of air when the parts are in the position indicated in Fig. 3, where the valve is opened for deflating the tire.

In use when it is desired to inflate a tire the plug-cap will be removed and the ordinary pump engaged in the threaded portion of the valve-casing. After removing the pump the valve 14 will of course close against its seat and prevent the escape of air, and then the plug-cap may be placed in position, as indicated in Fig. 2, with the tongue turned into the slot of the threaded portion. When it is desired to bleed or deflate a tire, the plug-cap will be removed and the tongue 20 turned or allowed to fall outward. Then by again inserting the plug-cap (either by placing the same at the end of or partially screwing the same within the valve-casing) an end thereof will engage with the valve 14 and force it downward, as indicated in Fig. 3, allowing the escape of air through the slot 19.

It will be noted that the flexible tube 13, carrying the valve 14, is somewhat longer than the tubular portion of the carrier 10, in which it is placed, so that when said carrier is screwed tightly down on the shoulder or seat 4 in the valve-casing a tight joint will be made. The valve and the valve-tube may be easily removed from the carrier should the valve become worn and a new one replaced.

Having thus described my invention, I claim as new and desire to secure by Letters Patent—

1. A valve comprising a tubular portion, a valve-seat extended downward in the tubular portion, a tube of yielding material in said tubular portion and a flap-valve in said yielding tube, the said flap-valve being extended normally at a transverse incline whereby it is caused to have an equal pressure at all its bearing-points, on the valve-seat, substantially as specified.

2. A valve, comprising a tubular casing having an interiorly-threaded portion, a valve-carrier having an exterior thread engaging therein, the said carrier having an inwardly-extending valve-seat, a tube of yielding material in said valve-carrier, and a flap-valve in said tube and having a hinge connection therewith at one side, the said flap-valve being normally extended at a transverse incline, whereby the pressure is equalized on the valve-seat, substantially as specified.

3. A valve, comprising a casing having annular ribs on its outer side, and a thimble for engaging over the nipple extended from a pneumatic tire into which the valve-casing is extended, the said thimble having its outer end turned over the end of the nipple, substantially as specified.

4. A valve comprising a tubular casing having its inner portion reduced, forming an exterior annular shoulder at the junction of the outer portion, the outer portion of said casing being provided with an interior screw-thread at the base of which an annular shoulder or seat is formed, a valve-carrier having an exterior screw-thread engaging with said interior screw-thread and adapted to engage its inner end against the shoulder or seat in the valve-casing, the said valve-carrier having an inwardly-extended valve-seat, and a flap-valve for engaging against said seat, the said flap-valve being normally extended at a transverse incline, substantially as specified.

5. A valve for a pneumatic tire, comprising a tubular casing having an interiorly-screw-threaded portion, a flap-valve arranged therein, a plug-cap having an exteriorly-screw-threaded portion for engaging the thread of the casing, the said screw-threaded portion having a longitudinal opening or slit, and a tongue pivoted to swing into and out of the slit, substantially as specified.

6. A valve for a pneumatic tire, comprising a tubular casing having an interiorly-screw-threaded portion and having an annular flange at its outer end, and also a projection outward from said flange forming a bearing, a plug-cap for engaging in said screw-threaded portion and having an annular channel in the inner side of its finger-piece, a flexible packing in said channel for engaging on the end of the valve-casing, a tongue pivoted to swing into and out of a slit in the threaded portion of the plug, and a valve in the valve-casing, substantially as specified.

WILLIAM G. URMSON.

Witnesses:
 JAMES STOUT,
 HARRY CHAMBERS.